United States Patent [19]

Boudouris

[11] 4,105,311
[45] Aug. 8, 1978

[54] FILM TRANSPORT SYSTEM
[75] Inventor: Angelo Boudouris, Sylvania, Ohio
[73] Assignee: Eprad Incorporated, Toledo, Ohio
[21] Appl. No.: 739,465
[22] Filed: Nov. 8, 1976
[51] Int. Cl.² .............................................. G03B 1/24
[52] U.S. Cl. .................................... 352/187; 226/76; 352/124; 352/166
[58] Field of Search .............. 352/189, 187, 190, 180, 352/124, 166, 91 S; 226/76

[56] References Cited
U.S. PATENT DOCUMENTS

| | | | |
|---|---|---|---|
| 1,166,120 | 12/1915 | Fox | 352/187 |
| 2,390,389 | 12/1945 | Redler | 352/180 |
| 3,606,526 | 9/1971 | Smith | 352/189 |
| 3,688,058 | 8/1972 | Findlay | 226/76 |
| 3,841,742 | 10/1974 | Belvard | 352/91 S |
| 3,979,966 | 9/1976 | Kotte | 74/436 |

FOREIGN PATENT DOCUMENTS

| | | | |
|---|---|---|---|
| 429,162 | 9/1911 | France | 352/166 |
| 380,133 | 9/1932 | United Kingdom | 352/189 |

Primary Examiner—Monroe H. Hayes
Attorney, Agent, or Firm—Oliver E. Todd, Jr.

[57] ABSTRACT

An improved transport system for a motion picture projector which permits either intermittent or continuous drive of a film advancement sprocket. The transport is capable of use selectively with film having, for example, either two or four perforations per picture frame. During normal operation of the projector, the sprocket is intermittently driven to advance the film through a gate while a shutter interrupts the projection light. For automated film rewind through the projector, the sprocket is driven at a continuous speed which is preferably higher than the average speed in which the film is intermittently advanced through the projector.

4 Claims, 3 Drawing Figures

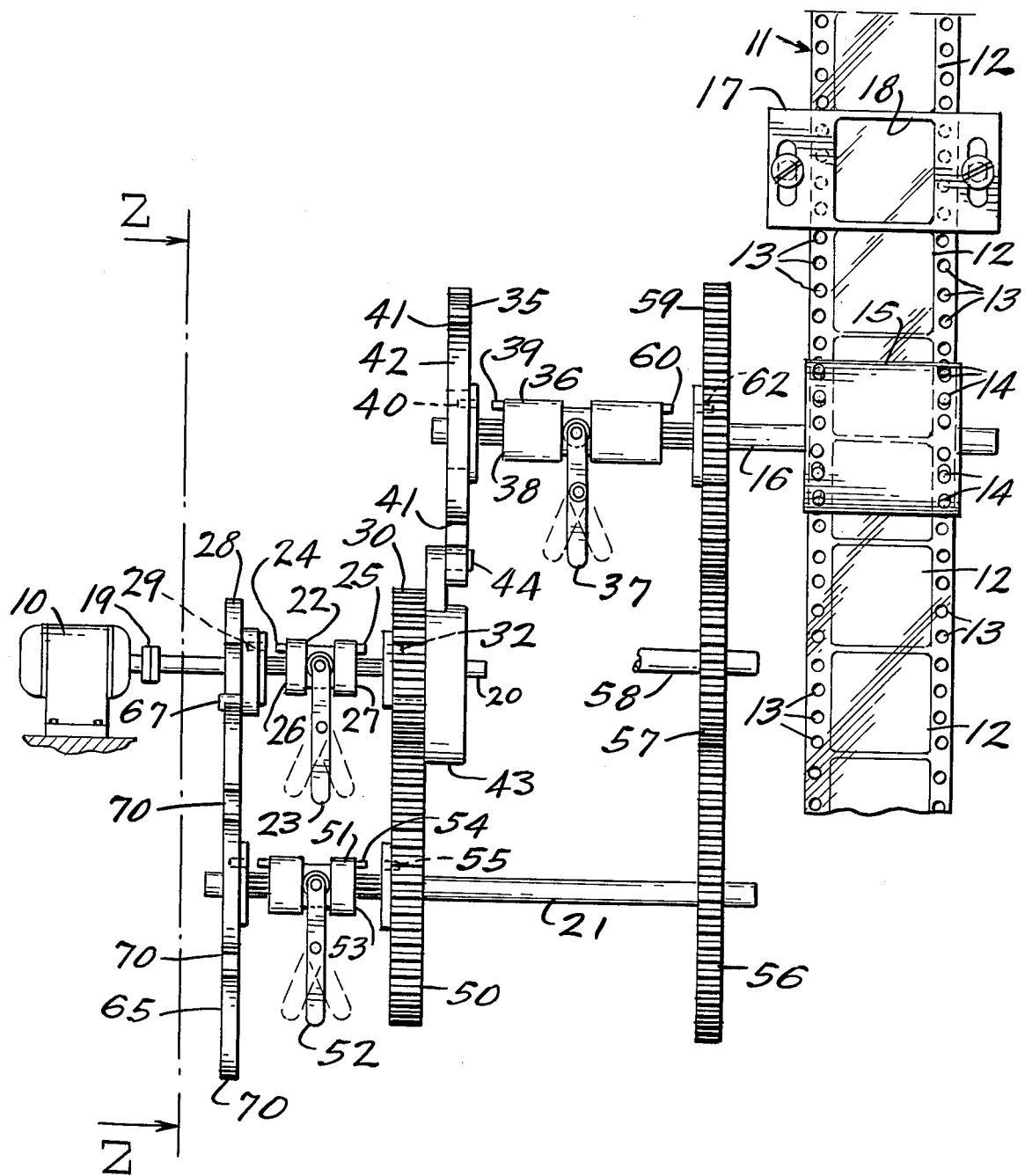
FIG-1-

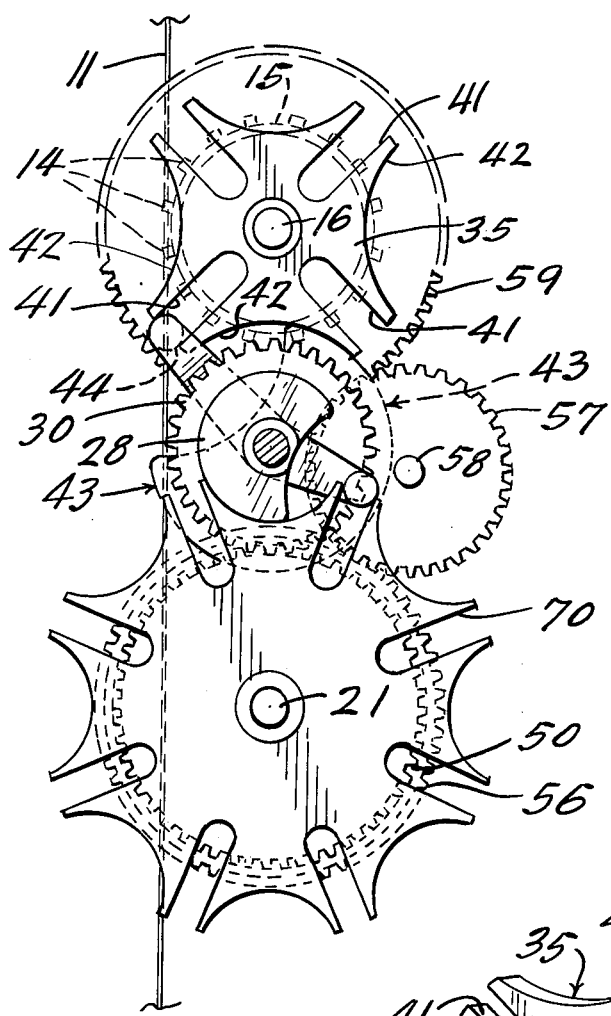
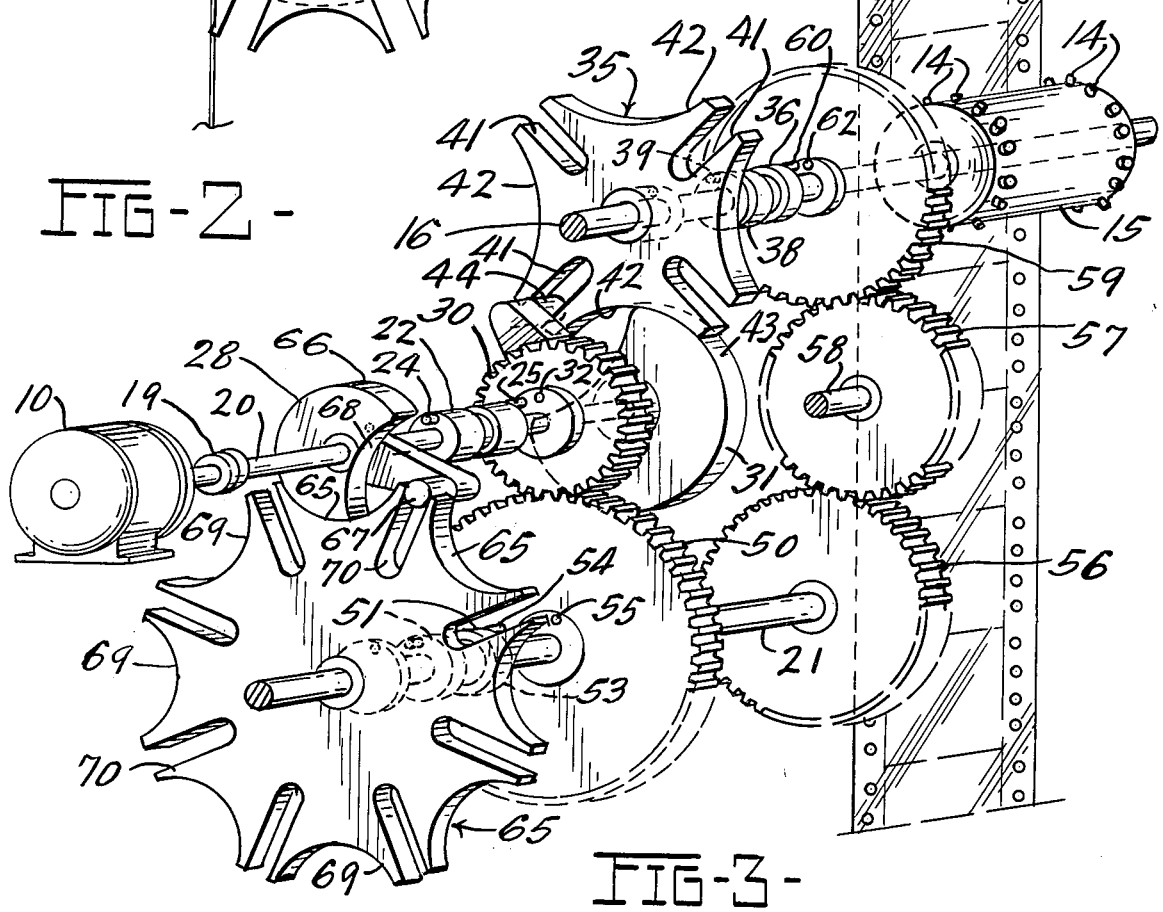
FIG-2-
FIG-3-

FILM TRANSPORT SYSTEM

BACKGROUND OF THE INVENTION

This invention relates to an improved transport system for motion picture film, particularly motion picture film which is advanced intermittently when being shown by a projector.

It is a standard practice in the motion picture industry to view film at a rate of 24 frames per second or 1440 frames per minute. A motion picture projector includes a transport capable of incrementally advancing the film until the next picture frame aligns with a gate while the projection light is interrupted by a shutter, of holding the film in a fixed position while the shutter is open to permit the projection light to shine through the film, then, when the shutter is again closed, to advance the film until the next frame is aligned with the gate, and to repeat this procedure. The film is advanced by an intermittently driven sprocket which engages perforations along the film edge. It is standard practice for the film to be made with four perforations per frame which are employed to incrementally pull the film through the film gate by the film sprocket. A well knwon mechanism for accomplishing the intermittent driving operation is a Geneva star wheel mechanism having a driving wheel which turns at a constant speed of 1440 rpm. Each revolution of the driving wheel rotates the star wheel ¼ of a revolution which is sufficient to advance the film through the gate from one frame to the next succeeding frame.

For various reasons, such as economy of film and simplification of the projection apparatus, it is anticipated that more motion picture films will be made with frames having only half the height of normal frames and, therefore, two perforations per frame rather than four. Accordingly, it is desirable to have the projection apparatus capable of operating with either of these two types of film.

It is necessary at the end of the time of showing a reel of film to rewind that reel so that it will be ready for the next projection. Rewinding is accomplished by any of a number of procedures but it is most convenient to employ the same apparatus used for the projection. Rewinding at the projection speed is much too slow for many operations, principally those of commercial cinemas, and so it is important to provide a convenient rewind mechanism which will operate as quickly as possible to return the film from the take-up reel to its original position on the supply reel for feeding through a projector. Projectors which are available today do not provide all of these features.

SUMMARY OF THE INVENTION

According to the present invention, an improved transport is provided for advancing and rewinding motion picture film through a motion picture projector. The transport is capable of intermittently advancing the film through a film gate one frame at a time during projection of the film. The film is advanced by a Geneva drive mechanism which intermittently rotates a sprocket for pulling the film through the gate. A clutch arrangement permits disengagement of the Geneva drive mechanism and engaging drive gears for rotating the sprocket at a continuous higher average speed in a reverse direction for rewinding the film backwards through the projector. In one embodiment of the invention, two separate Geneva drive mechanisms are provided for advancing the film at different rates through the projector. For example, one rate can be compatible with film having four perforations per picture frame and a second rate can be compatible with film having only two perforations per picture frame. One of the two drive mechanisms is selected by clutches for providing a film advancement rate compatible with a particular film being shown.

It is an object of this invention to provide an improved film transport capable of selectively moving a motion picture film, whether it has two or four perforations per frame, forward or backward through a film gate in an intermittent fashion at a normal projection speed, or of moving the film forward or backward through the film gate at a higher rate of speed in a continuous fashion.

Another object of this invention is to provide an improved film transport capable of intermittently advancing a motion picture film through a film gate in a projector and also capable of moving the film at a continuous high speed backwards through the gate during rewind.

The features of this invention are set forth particularly in the appended claims although the many embodiments of the invention may be best understood by reference to the attached drawings.

BRIEF DESCRIPTION OF THE DRAWINGS

FIG. 1 is a side elevational pictorial illustration of the film transport mechanism of this invention;

FIG. 2 is a cross sectional view of the film transport mechanism of the invention taken along line 2—2 of FIG. 1; and FIG. 3 is a perspective view of the film transport mechanism shown in FIGS. 1 and 2.

DESCRIPTION OF THE PREFERRED EMBODIMENTS

Referring now to FIGS. 1, 2 and 3, pictorial views are shown illustrating the mechanism of this invention. It is to be understood that these pictorial drawings illustrate the various shaft, gear, Geneva drive and clutch components of the film transport mechanism without any attempt to indicate the details of an enclosing housing and bearing support for the shafts and actuators for the clutches, which are of any standard design. The housing design enclosing the transport mechanism will be controlled, in part, by the design of a particular projector in which the transport mechanism will be installed and operated. A motor 10 is adapted to provide a source of power which is transmitted selectively through different power trains of shafts, gears, clutches and Geneva drive mechanisms to effectuate the necessary intermittent or continuous movement of a film 11 in a desired direction. The different power trains may provide an intermittent movement to the film 11 or a continuous movement to the film 11, as desired.

The film 11 is in the form of an elongated strip having longitudinally spaced picture frames 12. Assuming the film 11 is standard commercial 35 mm film, four perforations 13 will be spaced uniformly along each side of each film frame 12. The perforations 13 receive teeth 14 on a drive sprocket 15. The sprocket 15 is mounted on a shaft 16 such that, when the shaft 16 is rotated, the film 11 either is advanced by pulling downwardly through a gate 17 or is pushed backwards through the gate 17 during rewind. Normally, the sprocket 15 is rotated in predetermined increments such that each time the film 11 is advanced, the next successive frame 12 on the film 11 is pulled into alignment with an opening 18 through the gate 17. For the following description, it will be assumed that sixteen teeth 14 are provided around the periphery of each side of the sprocket 15. Since the film 11 is assumed to have four perforations 13 adjacent each film frame 12, the shaft 16 and the sprocket 15 are rotated through ¼ revolution or 90° increments each time the film 11 is incrementally advanced. However, the sprocket 15 may have a different number of teeth 14 around its periphery, so long as the total number of teeth is a direct multiple of the number of perforations 13 along each side of a frame 12.

In accordance with the present invention, the motor 10 is selectively connected through various Geneva mechanisms, gears and clutches for driving the shaft 16 either incrementally during a projection mode of operation or continuously during a rewind mode of operation. The motor 10 is connected through a coupler 19 to a main input drive shaft 20. The input shaft 20, and idler shaft 21 and the output shaft 16 are mounted on bearings in a suitable housing (not shown) to rotate about parallel axes. A clutch 22 is keyed or splined to rotate with the shaft 20 while being free to slide in an axial direction on the shaft 20, as controlled by a manual operating lever or fork 23. Engagement pins 24 and 25 project from opposite ends 26 and 27, respectively, of the clutch 22 in a direction parallel to the axis of the shaft 20. A first Geneva type driving wheel 29 is mounted to rotate freely on the shaft 20 adjacent the clutch end 26. When the lever 23 is manually moved to position the clutch 22 to the left such that the clutch end 26 abuts the driving wheel 28, the pin 24 on the clutch 22 engages a corresponding opening 29 on the driving wheel 28 such that the driving wheel 28 is locked to rotate with the shaft 20. A gear 30 and a second Geneva type driving wheel 31, which are connected together, also are mounted to rotate freely on the shaft 20, adjacent the clutch end 27. When the lever 23 is manually moved to position the clutch end 27 in aubtment with the gear 30, the pin 25 engages a corresponding opening 32 formed in the gear 30, locking the gear 30 and the driving wheel 31 to rotate with the shaft 20. When the lever 23 is moved to a third or neutral position, as shown, the pins 24 and 25 are disengaged from the adjacent driving wheel 28 and gear 30, respectively, and the shaft 20 rotates in neutral without driving either the driving wheel 28 or the gear 30 and driving wheel 31.

The driving wheel 31, which is rotatedly mounted on the shaft 20 with the gear 30, engages a Geneva star wheel 35. The star wheel 35 normally rotates freely on the shaft 16. A clutch 36 is keyed or splined to rotate with the shaft 16, while being free to slide in an axial direction on the shaft 16. A manual lever or fork 37 is connected for sliding the clutch 36 from a neutral position, as shown, to a position wherein a clutch end 38 abuts the star wheel 35 and a pin 39 projection from the clutch end 38 engages a corresponding opening 40 in the star wheel 35. When the clutch 36 is so positioned, the star wheel 35 is locked onto and drives the shaft 36 for in turn rotating the sprocket 15.

As best seen in FIGS. 2 and 3, when the Geneva mechanism, consisting of the driving wheel 31 and the star wheel 35, is engaged by the clutches 22 and 36, each revolution of the shaft 20 causes the shaft 16 to rotate ¼ revolution. The star wheel 35 is provided with four tooth slots 41 which are spaced uniformly around its periphery and extend radially inwardly towards the shaft 16. Concave surfaces 42 extend on the periphery of the star wheel 35 between the slots 41. The driving wheel 31 has a circular exterior surface 43 which is concentric with the input drive shaft 20 and corresponds in curvature to the concave surfaces 42 on the star wheel 35. The driving wheel 31 also includes a driving pin or tooth 44 which is located within a recessed area 45 for engaging the tooth slots 41. During a portion of each full revolution of the driving wheel 31, the star wheel 35 is driven by the tooth 44 through a 90° angular increment and is idle for the remaining portion. During the driving portion, the driving tooth 44 engages one of the slots 41 for rotating the star wheel 35 through the 90° increment. For the remaining or idle portion, the circular surface 43 on the driving wheel 31 fits within one of the concave surfaces 42 on the star wheel 35 to inhibit rotation of the star wheel 35. During this idle interval, a frame 12 on the film 11 is aligned with the opening 18 in the film gate 17 and a shutter is opened to direct light through the opening 15 for projecting such frame 12 onto a screen. Close tolerances are maintained between the surfaces 42 and 43 to prevent movement of the film frame 12 in the gate 17 during projection of such frame.

For normal operation of a projector with film 11 having four sprocket tooth perforations or holes 13 for each picture frame 12, as shown, the sprocket 15 is rotated through ¼ revolution each time the film is to be pulled through the film gate 17 to align the next film frame 12 with the gate opening 18. In this mode of operation, the lever 23 is positioned such that the clutch 22 engages the connected gear 30 and drive wheel 31. Thus, the drive wheel 31 is rotated directly with the shaft 20 as the shaft 20 is rotated by the motor 10. The lever 37 is positioned such that the clutch 36 engages the Geneva star wheel 35. As a consequence, the motor 10 rotates the shaft 20, the shaft 20 is connected through the clutch 22 to rotate the drive wheel 31 which in turn incrementally rotates the Geneva star wheel 35, the Geneva star wheel 35 is connected through the clutch 36 to similarly incrementally rotate the shaft 16 which in turn rotates the sprocket 15. The motor 10 is driven at a predetermined speed in a forward direction for advancing the film 11 through the gate 17 at a desired frame rate, such as at a rate of 1440 frames per minute.

In recent years, there has been a considerable increase in automation in motion picture theaters to reduce the cost of operating the theaters. One major cost factor in operating a theater is in the labor expense required to operate the projector system. Typically, a projectionist was required to start a first projector to project a first film reel and, when the reel is completed, to start a second projector to show the next film reel. While the second projector is operating, the projectionist rewinds the film which has just run on the first projector and threads a third reel of film through the first projector. In more recent systems which are at least partially automated, it is sometimes desirable to automatically rewind the film directly through the projector after it has been shown. However, when the film is rewound through the projector, it had to be run at substantially the same speed at which it was run forward through the projector due to speed limitations for the intermittent drive which must push the film back through the projector gate. Running the intermittently driven film sprocket at higher than normal speeds placed considerable stress on the film.

According to the present invention, a separate drive train is provided for driving the sprocket 15 at a constant or uniform speed from the motor 10 to provide a fast forward or fast reverse mode for moving the film 11 through the gate 17. The gear 30 on the shaft 20 meshes with a gear 50 on the shaft 21. A clutch 51 is mounted on the shaft 21 by means of keys or splines to permit the clutch 51 to slide axially on the shaft 21 while being restricted to rotate with the shaft 21. A lever or fork 52 is provided for positioning the clutch 51 axially on the shaft 21. By manually moving the lever 52, the clutch 51 may be positioned such that an end 53 abuts the gear 50 and a pin 54 projecting from the clutch end 53 engages a corresponding opening 55 in the gear 50. When the clutch 51 is so positioned, the gear 50 is locked onto the shaft 21 for rotatably driving the shaft 21 when the gear 30 is rotated. The shaft 21 is also permanently connected to a gear 56. The gear 56 meshes with an idler gear 57 which rotates on a shaft 58. The idler gear 57 in turn meshes with a gear 59 on the shaft 16.

A pin 60 extends from an end 61 of the clutch 36. When the clutch 36 is moved axially on the shaft 16 by means of the manual lever 37 to a position wherein the end 61 abuts the gear 59, the pin 60 engages an opening 62 in the gear 59 for locking the gear 59 onto the shaft 16. By positioning the clutch 22 to lock the gear 30 onto the shaft 20, positioning the clutch 51 to lock the gear 50 onto the shaft 21 and positioning the clutch 36 to lock the gear 59 onto the shaft 16, the shaft 20 is connected to the shaft 16 through a gear train consisting of the gears 30, 50, 56, 57 and 59 for rotating the shaft 16 at a continuous speed. When the motor 10 is operated in reverse at a higher than normal speed, the sprocket 15 is driven at a continuous speed for pushing the film 11 backwards through the gate 17 at a high rate of speed for continuously rewinding the film 11 through the projector without excessively stressing the film 11.

For economical purposes, film is sometimes manufactured with frames having half the height of the frames 12 shown on the film 11. As a consequence, there are only two sprocket holes on each side of a film frame and the film is advanced through increments only half the distance of the increments shown for the film 11. In other words, the sprocket 15 is advanced through eight 45° increments per revolution of the shaft 16 instead of four 90° increments per revolution. The change in the drive rate for the sprocket 15 is achieved by means of a second Geneva mechanism including the driving wheel 28 on the shaft 20 and a driven wheel 65 which is mounted to rotate on the shaft 21. As best seen in FIGS. 2 and 3, the driving wheel 28 includes a circular surface 66 which is concentric with the shaft 20 and also has a driving pin or tooth 67 adjacent a recessed portion 68 in the circular surface 66. The driven wheel 65 has eight concave surfaces 69 spaced uniformly around its periphery with tooth slots 70 extending radially inwardly between each adjacent two of the concave surfaces 69. As the driven wheel 28 rotates from the position shown in FIG. 2, the tooth 67 on the wheel 28 engages one of the slots 70 for rotating the driven wheel 65 through 45°. After the driven wheel 65 is rotated through the 45° increment and the tooth 67 leaves the slot 70, the circular surface 66 on the driving wheel 28 engages a concave surface 69 on the driven wheel 65 for preventing rotation of the driven wheel 65. When the driving wheel 28 then rotates further through approximately 315°, the driving pin 67 will engage the next tooth slot 70 on the driven wheel 65 for advancing the driven wheel 65 through another 45° increment. As a consequence, for each rotation of the driving wheel 28, the sprocket 15 rotates through 45° for advancing the film through the film gate 17 by one picture frame.

In some cases, it may be desirable to have the sprocket 15 in a "free wheeling" state wherein it is disconnected from the motor 10. This may be achieved merely by positioning the clutch 36 in a neutral position between the star wheel 35 and the gear 59 so that neither are connected to the shaft 16. On the other hand, if it is desired to place some loading on the sprocket 15 while permitting it to turn independently of the motor 10, the clutch 36 may be positioned to lock the gear 59 onto the shaft 16 and the clutch 51 is positioned in a neutral position, disconnecting both the gear 50 and the driven wheel 65 from the shaft 21. In this mode, when the sprocket 15 is rotated by pulling the film 11 through the gate 17, the gears 59, 57 and 56 and the shaft 21 will also rotate to place some loading on the sprocket 15.

In the above description, the three clutches 22, 36 and 51 have been described as being axially positioned by means of manual levers or forks 23, 37 and 52, respectively. It should be appreciated that the levers 22, 37 and 52 may also be replaced with solenoid actuators which electrically position the clutches 22, 36 and 51 to select the drive train between the motor 10 and the sprocket 15. Or, other known types of clutches may be used in the above described apparatus for selectively connecting and disconnecting the driving wheel 28 and the combined gear 30 and driving wheel 31 to the shaft 20, for selectively connecting the star wheel 35 or the gear 59 to the shaft 16 and for selectively connecting the gear 50 and the driven wheel 65 to the shaft 21. For example, the star wheel 35 can be splined or keyed to rotate at all times with the shaft 16 while being free to slide in an axial direction. By moving the star wheel 35 axially away from the driving wheel 31, the wheels 31 and 35 will become disengaged. The wheels 31 and 35 are re-engaged by sliding the star wheel 35 back to its original position with either the tooth 21 engaging a slot 41 or the curved surface 43 engaging a concave surface 42. The gear pair 30 and 50 and the wheels 28 and 65 may be engaged and disengaged in a similar manner. It is preferable to provide a slight taper in an axial direction to the wheels 28, 65, 31 and 35 and the gears 30 and 50 to facilitate meshing when moved axially by such a clutch means. It will also be appreciated that various other modifications and changes may be made in the above described film transport without departing from the spirit and the scope of the following claims.

What I claim is:

1. An improved transport for moving film through a gate in a motion picture projector comprising, in combination, a film engaging sprocket mounted on a drive shaft, a motor, first gear means having an intermittently rotated output for a continuously rotated input, first clutch means for selectively connecting and disconnecting said first gear means between said motor and said drive shaft, said motor intermittently rotating in one direction said drive shaft through said first gear means when said first clutch means is connected for intermittently pulling the film through the gate, second gear means having a continuously rotated output for a continuously rotated input, and second clutch means for selectively connecting and disconnecting said second gear means between said motor and said drive shaft, said motor continuously driving in an opposite direction said drive shaft through said second gear means when said second clutch means is connected for pushing the film continuously back through the gate during rewind of the film.

2. An improved transport for selectively moving film intermittently or continuously through a gate in a motion picture projector, as set forth in claim 1, and further including a third gear means having an intermittently rotated output for a continuously rotated input, the outputs of said first and third gear means rotating through different increments, and including third clutch means for selectively connecting and disconnecting said third gear means between said motor and said driven shaft whereby, when said third gear means is connected by said third clutch means, said sprocket is intermittently rotated in said one direction by said motor to intermittently pull the film through the gate.

3. An improved transport for selectively moving film intermittently or continuously through a gate in a motion picture projector as set forth in claim 2, wherein said first, second and third clutch means include means for simultaneously disconnecting each of said first, second and third gear means from between said motor and said drive shaft whereby said sprocket is free to rotate.

4. An improved transport for selectively moving film intermittently or continuously through a gate in a motion picture projector, as set forth in claim 3, wherein said first and third gear means comprise Geneva drive mechanisms.

* * * * *